United States Patent [19]

Dömer et al.

[11] 4,331,366

[45] May 25, 1982

[54] COMBINED THRUST AND SUPPORT BEARING FOR TURBOGENERATORS

[75] Inventors: Wolfgang Dömer, Schneisingen, Switzerland; Helmut Klepper, Einhausen, Fed. Rep. of Germany

[73] Assignee: BBC Brown, Boveri & Company Limited, Baden, Switzerland

[21] Appl. No.: 184,938

[22] Filed: Sep. 8, 1980

[30] Foreign Application Priority Data

Oct. 31, 1979 [CH] Switzerland .................... 9752/79

[51] Int. Cl.³ .................. F16C 17/10; F16C 23/04; F16C 35/02
[52] U.S. Cl. .................................. 308/22; 308/25; 308/162
[58] Field of Search .................... 308/15, 22, 25, 36, 308/72, 161, 162, 245, DIG. 14, DIG. 15

[56] References Cited

U.S. PATENT DOCUMENTS

| 1,678,968 | 7/1928 | Allen | 308/25 |
| 2,524,693 | 10/1950 | Bryant | 308/162 |
| 3,441,326 | 4/1969 | Swenson | 308/161 |
| 3,704,921 | 12/1972 | Skytta | 308/22 |
| 4,008,926 | 2/1977 | Belperin | 308/15 |
| 4,170,388 | 10/1979 | Naegeli | 308/15 |
| 4,256,353 | 3/1981 | Fischer et al. | 308/72 |

FOREIGN PATENT DOCUMENTS

| 884801 | 7/1953 | Fed. Rep. of Germany | 308/22 |
| 2632460 | 1/1978 | Fed. Rep. of Germany | 308/15 |
| 2636111 | 2/1978 | Fed. Rep. of Germany | 308/22 |
| 1041181 | 10/1953 | France | 308/22 |
| 825890 | 12/1959 | United Kingdom | 308/58 |
| 1388571 | 3/1975 | United Kingdom | 308/36 |

*Primary Examiner*—Richard R. Stearns
*Attorney, Agent, or Firm*—Werner W. Kleeman

[57] ABSTRACT

A combined thrust and support bearing for turbogenerators, wherein within a stationary bearing block there is freely displaceable in the direction of the shaft axis a bearing housing rigidly connected with the end face or side of the turbine housing. Both of the thrust bearings and the support bearing arranged therebetween are fixed in axial direction within the bearing housing.

3 Claims, 6 Drawing Figures

COMBINED THRUST AND SUPPORT BEARING FOR TURBOGENERATORS

BACKGROUND OF THE INVENTION

The present invention relates to a new and improved construction of a combined thrust and support bearing for turbogenerators.

Generally speaking, the combined thrust and support bearing arrangement of the present development is of the type which comprises a bearing block rigidly secured to a foundation and displaceable thrust and support bearing elements.

In the case of turbogenerators the common shaft of the usually structurally separated turbine stages and the generator are mounted upon a spatially fixed bearing block or arrangement which is fixed at the turbine, a fixed or displaceable thrust bearing block and a number of intermediate and end bearing blocks. In this way it is possible for the components of the installation to expand without hinderance in the lengthwise direction under the action of the thermal elongations which arise upon start-up and shut-down of the installation as well as in the presence of load changes.

With some prior known constructions of axially displaceable thrust bearing blocks the thrust bearing taking-up the lengthwise forces of the shaft and the support bearing which takes up the transverse forces, predominantly therefore the weight load, are combined in a common bearing block arrangement. This common bearing block arrangement, at its base or sole portion, slidably automatically participates in the displacements of the turbine housing. For this purpose there are provided between the bearing blocks and the end faces or sides of the housing of the turbine stages positive or form-locking elements which rigidly transmit to both sides the expansion movements originating at the fixed bearing block. Furthermore, the displaceable bearing blocks are secured against tilting of the bearings about the bearing shaft by form-locking holddown elements. The tilting of turning movements are caused by additional rotational moments or torques occurring during load increase and pipeline reactions.

According to a further known construction of turbogenerators all of the bearing blocks are fixedly threadably connected with the foundation and their thrust bearing, in each case, is mounted within a bearing housing which is displaceable within the bearing block. The support bearing is non-displaceably arranged in the bearing block, so that during operation the shaft journal displaces in relation to the bearing race surfaces.

The last of the previously mentioned constructions is associated with the drawback that it has a relatively long structural length. This means that in relation to shorter bearings, apart from the increased expenditure in material and construction costs, for a given shaft diameter there is present an increased slimness of the shaft, and thus, lower critical rotational speeds and increased vibrational loads. With the first-mentioned design there exists the drawback that their connection with the foundation cannot be rigid owing to the displacement of the bearing which is not free of play, i.e. it works during operation of the equipment and can tilt, bind and close, which, in turn, can lead to deformations of the shaft, bearing and housings.

With the second design having stationary bearing blocks and displaceable thrust bearings there is realized a faultless, rigid anchoring of the bearing block at the foundation. Nonetheless, in this case thre still rises the drawback of increased structural length and relatively low critical rotational speed.

SUMMARY OF THE INVENTION

Therefore, with the foregoing in mind it is a primary object of the present invention to provide a new and improved construction of a combined thrust and support bearing for turbogenerators which is not associated with the aforementioned drawbacks and limitations of the prior art constructions.

Another and more specific object of the present invention aims at providing a new and improved combined thrust and support bearing arrangement for turbogenerators which avoids the aforementioned drawbacks of the heretofore known bearing constructions, and, in particular, aims at providing a short, compact construction and exact guiding of the displaceable bearing components and enables a rigid connection of the bearing block with the foundation.

Now in order to implement these and still further objects of the invention, which will become more readily apparent as the description proceeds, the combined thrust and support bearing arrangement for turbogenerators comprises a bearing housing displaceable in the bearing block in the lengthwise direction of the shaft. This bearing housing receives the thrust bearing elements and the support bearing elements. The support bearing elements are arranged between the thrust bearing elements. There are also provided slide elements for supporting the bearing housing within the bearing block, these slide elements enabling an axial displacement of the bearing housing in relation to the fixed bearing block. Additionally, guide elements serve for the axial guiding of the bearing housing, and holddown elements secure the bearing housing against tilting movements about the axis of the shaft.

BRIEF DESCRIPTION OF THE DRAWINGS

The invention will better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
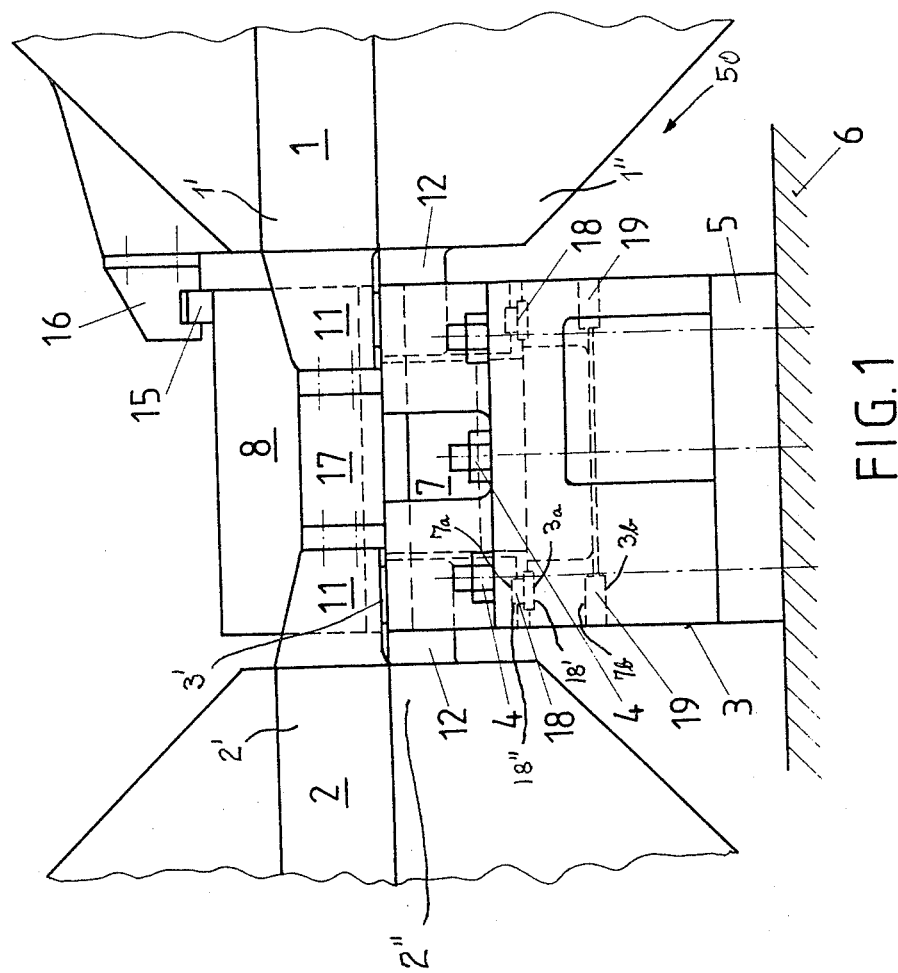
FIG. 1 is an elevational view of an intermediate bearing of the combined thrust and support bearing arrangement of the invention.
Figure 2:
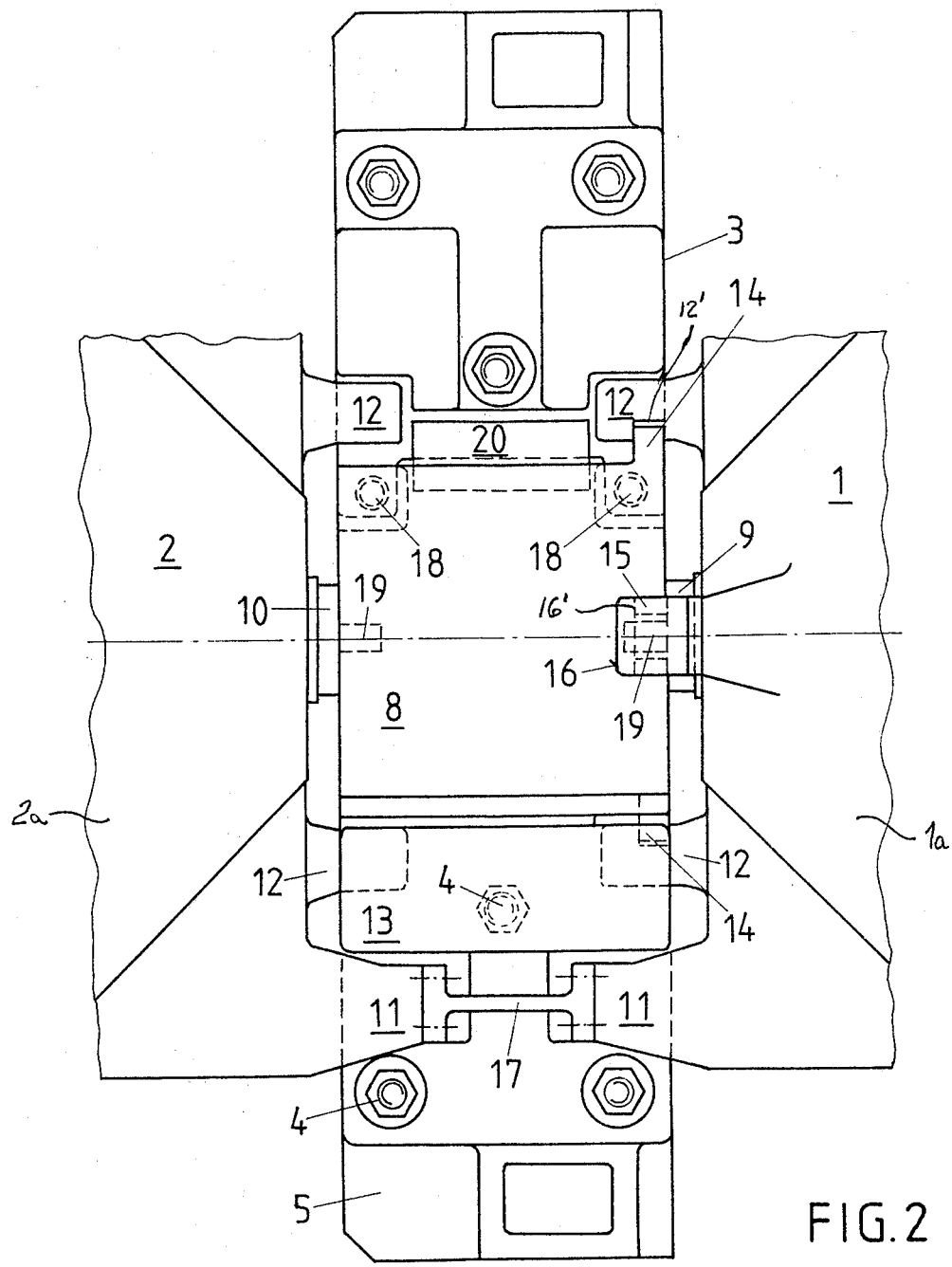
FIG. 2 is a top plan view of the arrangement of FIG. 1.
Figure 3:
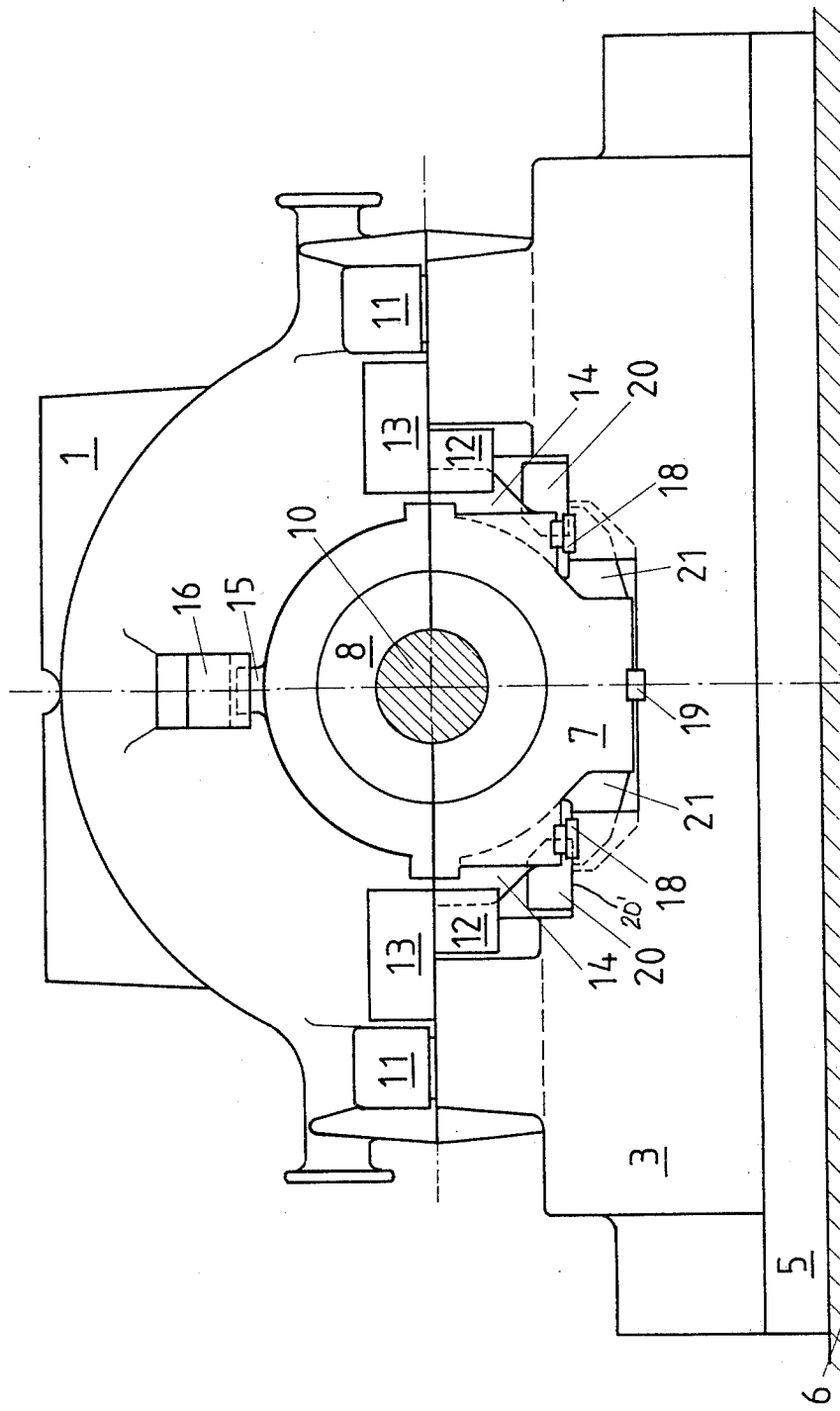
FIG. 3 is a side elevational view of the arrangement of FIG. 1.

Describing now the drawings, it is to be understood that the illustrations of FIGS. 1 to 3 and FIGS. 4 to 6 have been shown in the same scale. Turning attention specifically to FIGS. 1, 2 and 3 it is to be understood that reference character 1 designates the housing of a high-pressure turbine stage, reference character 2 the housing of an intermediate-pressure turbine stage, and reference character 3 the bearing block which contains the bearing elements and the coupling of the shaft portions located between both of the housings 2 and 3. The bearing block 3 is attached by means of the anchoring screws or bolts 4 or equivalent structure at a base plate 5 which, in turn, is anchored to a foundation 6. As particularly evident from the side elevational view illustrated in FIG. 3, the bearing block 3 receives a bearing housing lower portion 7 which, in conjunction with the bearing housing upper portion 8, houses both of the shaft journals or shaft stubs 9 and 10 of both turbine stages and their bearing elements, which will be described more fully hereinafter in conjunction with FIGS. 4 and 5.

The housings 1 and 2 of both turbine stages bear by means of support noses 11 or equialent structure, which are provided at the end face of the turbine housing upper portions 1' and 2', upon raised sockets 3' of the bearing block 3. In order to be able to take-up the reaction moment of the turbine which is effective at the turbine housing, generally indicated by reference character 50, the end faces of the turbine housing lower portions 1" and 2" are likewise provided with support or contact noses 12. To prevent tilting of the turbine housing 50 about the shaft axis and to secure such turbine housing against the action of upwardly directed vertical forces there are provided turbine housing holddown elements or holddown means 13. In FIG. 2 there have been omitted from the right-hand half of the illustration the upper support or contact noses 11 and the turbine housing holddown elements 13, so that the lower support or contact noses 12 are completely visible.

As best seen by referring to FIGS. 1 and 2, the lower support or contact noses 12 or the like, belonging to the high-pressure turbine stage 1, have wide grooves 12' into which engage the entrainment noses or dogs 14 of the bearing housing lower portion 7. In the same manner a nose 15 at the bearing housing upper portion 8 engages into a groove 15' provided at an entrainment nose 16 threadably connected with the turbine housing upper portion 1. In this manner the turbine housing 1 of the high-pressure turbine stage 1a entrains the bearing housings 7 and 8 during displacement owing to thermal expansion. In order to insure for the relative position of both of the turbine stages 1a and 2a the end sides or faces of their support noses 11 are connected by spacer bridges or elements 17, so that a displacement of the turbine stage 1a is rigidly transmitted to the turbine stage 2a. In this way there is insured for the position of both turbine stages 1a and 2a relative to the bearing housings 7 and 8 and the bearing elements located therein at all temperatures.

To render possible such displacement of the bearing housings 7 and 8, the bearing housing lower portion 7 bears upon slide elements 18. These slide elements 18 each comprise two mutually displaceable disks 18', 18", wherein the lower disk 18" is seated in a recess 3a of the bearing block 3 and the upper disk 18" is seated in a recess 7a of the bearing housing lower portion 7.

In order to axially guide the bearing the bearing housings 7 and 8 there are provided two guide keys or wedges 19 or equivalent structure which are fixed in grooves 3b of the bearing block 3 and engage into grooves 7b provided at the base of bearing housing lower portion 7, as best seen by referring to FIG. 1.

Between the two sliding or slide elements 18 at one side there are located the bearing housing holddown elements 20 which are threadably connected at the bearing block 3 and prevent tilting of the bearing housing 7 and 8 about the shaft axis, but however do not impair the lenghwise displaceability of the bearing housing 7 and 8 in relation to the bearing block 3. The tilting is prevented in that lateral brackets 21 bear against the free underside of the lower face of the holddown elements 20.

Figure 4:
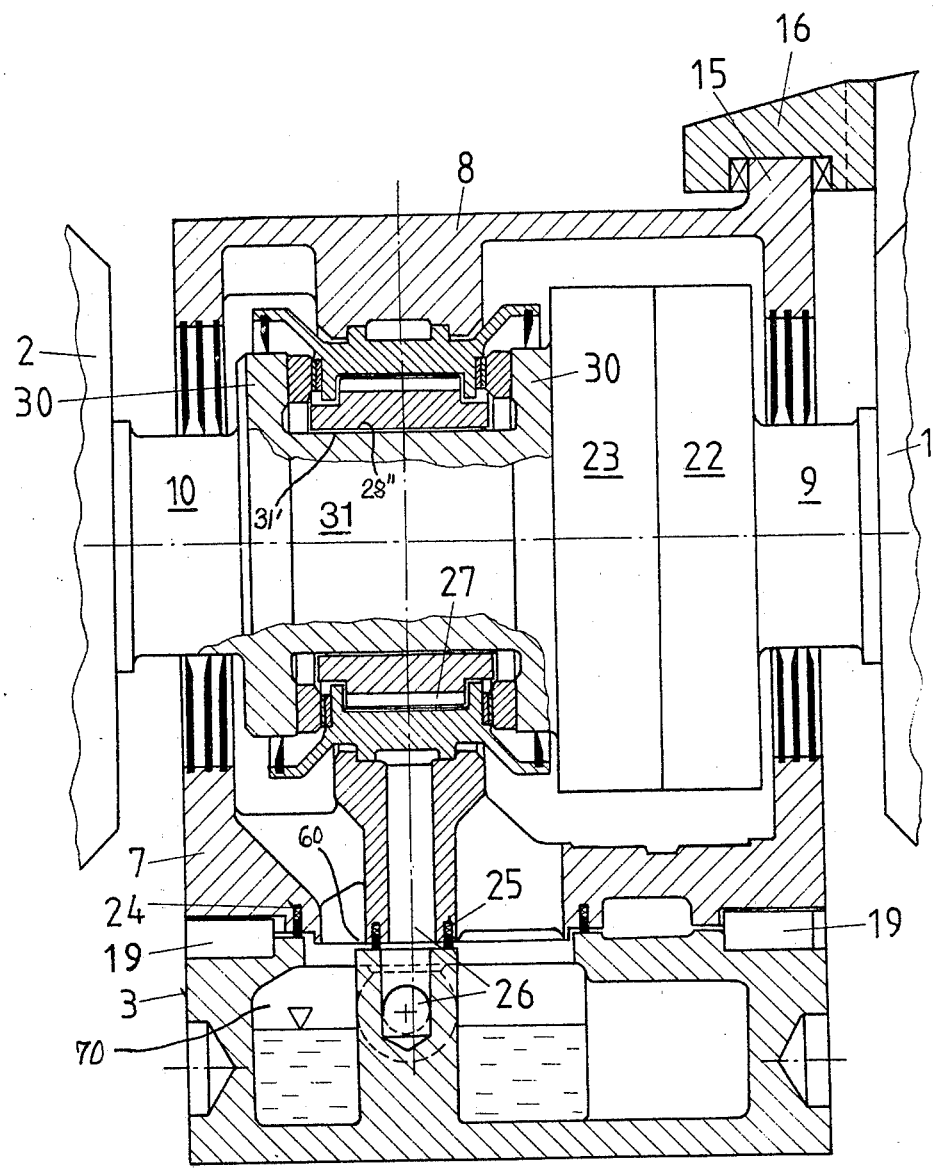
FIG. 4 is an axial sectional view through the bearing housing and the bearing block.
Figure 5:
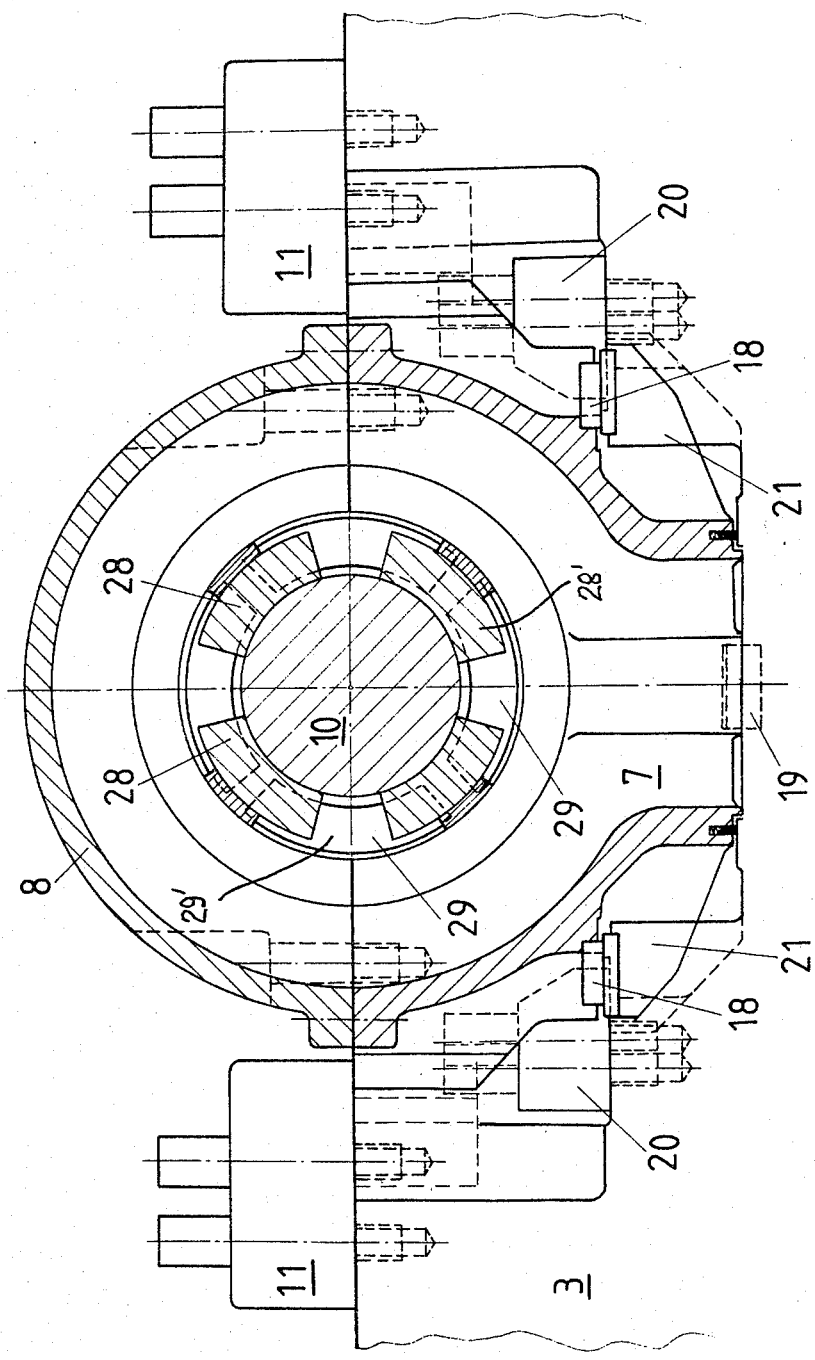
FIG. 5 is a cross-sectional view on the scale essentially corresponding to that of FIG. 4, through the bearing housing with a part of the bearing block and the attachment element.
Figure 6:
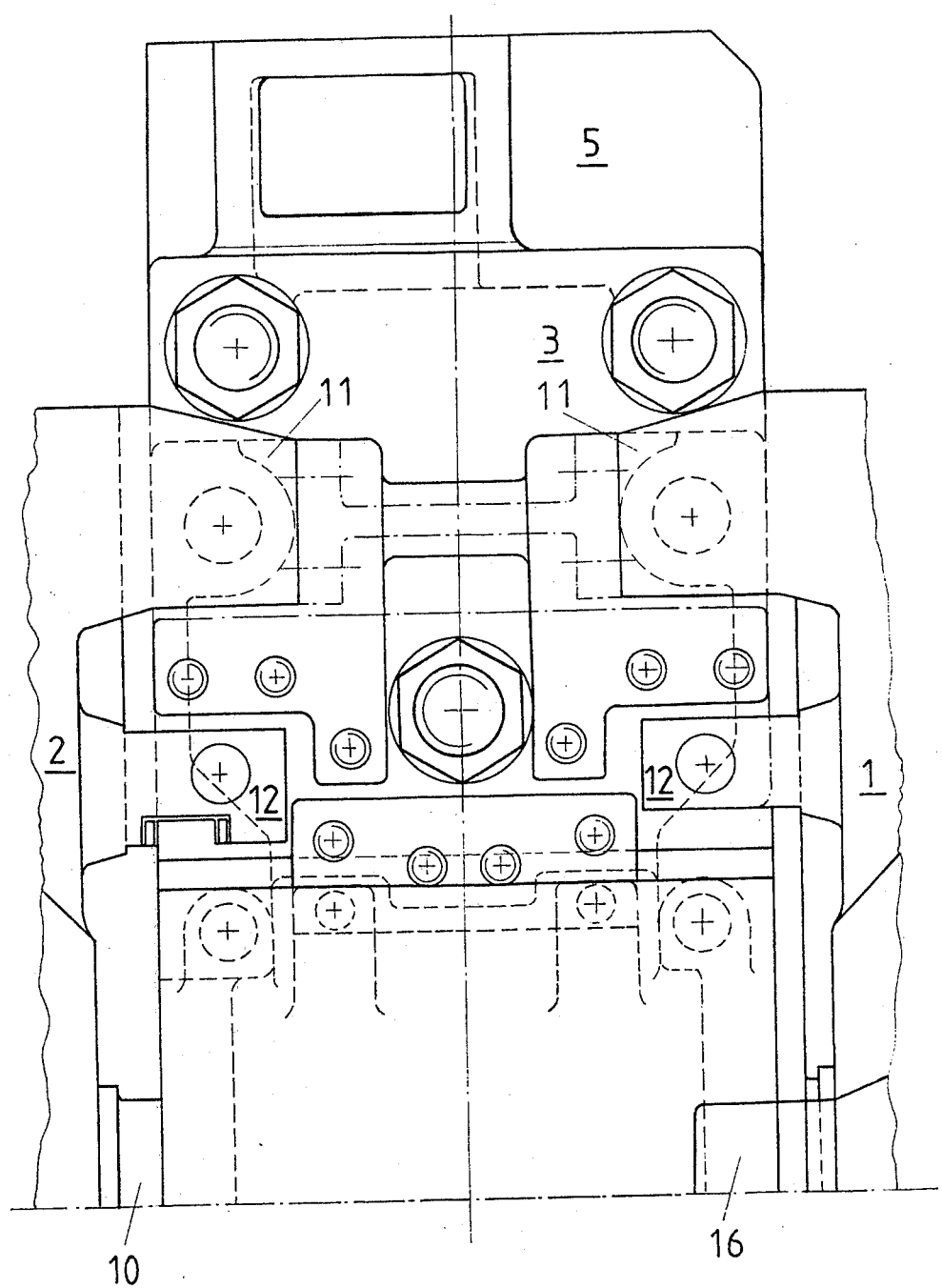
FIG. 6 illustrates one-half of the bearing in plan view.

FIG. 4, illustrating a longitudinal section through the bearing arrangement, shows the coupling flanges 22 and 23 of both shaft journals or stubs 9 and 10 and the elements of the shaft bearing arrangement.

At the base of the bearing housing lower portion 7 there are provided spring-loaded sealing rings 24 and 25 which seal the gap 60 between the bearing housing 7 and 8 and the bearing block 3. The hollow compartment or space 70 in the bearing block 3 serves as an oil sump for the lubricant oil which flows out of the bearing locations. This lubricant oil is infed in conventional manner to the bearing locations by means of the lubricant oil-infeed channel 26 and the ring channel 27. The bearing locations comprise support bearing segments 28 and thrust bearing segments 29 which coact with the bearing cams or combs 30. By virtue of the arrangement of the support bearing 28' defined by the support bearing segments 28 between both of the thrust bearings 29' defined by the thrust bearing segments 29 there is realized in axial direction a decisive saving in space in relation to heretofore known constructions, and additionally, the advantage that the support bearing segments 28 can retain their position in relation to the support bearing journal 31 throughout every position of the bearing housing 7 and 8, so that the support bearing 28' always works under the best conditions with the mutually coacting running surfaces 31' and 28" of the support bearing journal 31 and the support bearing segments 28, respectively. The slide elements 18 allow for a slight displacement of the bearing housing 7 and 8 in relation to the bearing block 3 in the presence of thermal expansions, so that binding is avoided. Moreover, the spring-loaded sealing rings 24 and 25 enable use of stationary bearing block 3 as an oil sump or reservoir and the arrangement of the lubricant oil lines and channels at or in the same.

Since such bearing arrangement can be built, for the same loadability, so as to have a shorter dimension than conventional bearings for turbogenerators, the shaft can be designed to be shorter, and thus, at the same critical rotational speed can have a smaller diameter and therefore is less expensive to fabricate. Hence, also the radial dimensions of the bearing are more compact. Apart from these significant economical advantages the bearing arrangement of the present development also affords technical and operational advantages, namely: faultless running properties of the support bearing and lower maintenance because of the reduced wear.

While there are shown and described present preferred embodiments of the invention, it is to be distinctly understood that the invention is not limited thereto, but may be otherwise variously embodied and practiced within the scope of the following claims. Accordingly,

What we claim is:

1. A combined thrust and support bearing for turbogenerators, comprising:

a bearing clock capable of being rigidly secured to a foundation;
a bearing housing displaceable in lengthwise direction of a shaft of the turbogenerator and located within the bearing block;
thrust bearing elements and support bearing elements arranged in said bearing housing;
said support bearing elements being arranged between said thrust bearing elements;
slide elements for supporting the bearing housing in the bearing block;
said slide elements enabling an axial displacement of the bearing housing in relation to the stationary bearing block;
guide elements for axially guiding the bearing housing; and
holddown elements for securing the bearing housing against tilting movements about the shaft axis.

2. The combined thrust and support bearing as defined in claim 1, wherein:
each of said slide elements comprise a respective pair of disks which contact one another and are displaceable with respect to one another;
said disks defining a lower disk and an upper disk;
the bearing block being provided with a recess for receiving the lower disk; and
the bearing housing having a bearing housing lower portion; and
said bearing housing lower portion being provided with a recess for receiving the upper disk.

3. The combined thrust and support bearing as defined in claim 1, wherein:
said guide elements comprise guide wedge means;
said bearing housing including a bearing housing lower portion having a base;
said bearing block having a base;
groove means provided at each of the bases of said bearing housing lower portion and said bearing block;
said guide wedge means engaging with said groove means at the base of said bearing housing lower portion and said bearing block below the shaft axis;
said holddown elements having tilt-preventing surface means; and
bracket means provided for said lower housing bearing portion with which coact said tilt-preventing surface means of said holddown elements.

* * * * *